(12) United States Patent
Ishida et al.

(10) Patent No.: US 12,335,416 B2
(45) Date of Patent: Jun. 17, 2025

(54) TIMESTAMP ISSUING METHOD

(71) Applicant: NEC Solution Innovators, Ltd., Tokyo (JP)

(72) Inventors: Kunihiro Ishida, Tokyo (JP); Tatsunori Yamagami, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 308 days.

(21) Appl. No.: 17/969,800

(22) Filed: Oct. 20, 2022

(65) Prior Publication Data

US 2023/0126583 A1 Apr. 27, 2023

(30) Foreign Application Priority Data

Oct. 27, 2021 (JP) ................. 2021-175484

(51) Int. Cl.
*H04L 9/32* (2006.01)
*H04L 9/00* (2022.01)

(52) U.S. Cl.
CPC .......... *H04L 9/3297* (2013.01); *H04L 9/3236* (2013.01); *H04L 9/50* (2022.05)

(58) Field of Classification Search
CPC ................................................... H04L 9/3297
See application file for complete search history.

(56) References Cited

U.S. PATENT DOCUMENTS

| | | | | |
|---|---|---|---|---|
| 10,136,322 B2 * | 11/2018 | Rougier | ................ | H04L 9/3297 |
| 10,771,241 B2 * | 9/2020 | Yang | ..................... | H04L 9/3265 |
| 10,790,988 B1 * | 9/2020 | Li | ......................... | H04L 9/3247 |
| 11,188,523 B1 * | 11/2021 | Harold | .................. | H04L 9/3297 |
| 11,271,908 B2 * | 3/2022 | Soundararajan | ...... | H04L 9/0643 |
| 11,297,500 B2 * | 4/2022 | Jain | ....................... | H04L 9/3297 |
| 11,775,479 B2 * | 10/2023 | Wood | ................... | G06F 16/1734 |
| | | | | 707/749 |
| 11,917,081 B2 * | 2/2024 | Aschauer | ................. | H04L 9/30 |
| 2018/0268382 A1 * | 9/2018 | Wasserman | ........... | H04L 9/3247 |
| 2019/0213333 A1 * | 7/2019 | Williams | ............ | G06F 21/6245 |
| 2020/0192886 A1 * | 6/2020 | Mishra | ................ | G06F 16/2365 |
| 2020/0403812 A1 * | 12/2020 | Ajitomi | ................... | H04L 9/321 |
| 2021/0044976 A1 * | 2/2021 | Avetisov | ................. | G06F 21/64 |
| 2021/0136017 A1 * | 5/2021 | Liu | ....................... | H04L 12/185 |
| 2021/0266306 A1 * | 8/2021 | Furman | ............... | G06F 16/9566 |
| 2021/0357914 A1 * | 11/2021 | Silvestri | ................ | H04L 9/0825 |
| 2022/0094557 A1 * | 3/2022 | Fujishiro | ............... | H04L 9/3268 |
| 2023/0308277 A1 * | 9/2023 | Van Cleve | .......... | H04L 63/0807 |

FOREIGN PATENT DOCUMENTS

JP 6886350 B2 6/2021

\* cited by examiner

*Primary Examiner* — Viral S Lakhia

(57) ABSTRACT

A local timestamp issuing apparatus according to the present invention includes: a timestamp issuing unit configured to, in response to a request for a timestamp for electronic data by a predetermined information processing apparatus installed in the same local environment, issue a timestamp token for the electronic data; a ledger timestamp requesting unit configured to, at a preset timing, connect to a specific timestamp issuing apparatus installed on the Internet, and request a timestamp for ledger data including the timestamp token issued for the electronic data from the specific timestamp issuing apparatus; and a ledger timestamp acquiring unit configured to acquire the timestamp token issued for the ledger data from the specific timestamp issuing apparatus.

8 Claims, 9 Drawing Sheets

Fig.3

| TIME | HASH | TOKEN |
|------|------|-------|
|      |      |       |
|      |      |       |

Fig.6

| TIME | HASH | TOKEN | FUZZY HASH |
|---|---|---|---|
|  |  |  |  |
|  |  |  |  |

TIMESTAMP ISSUING METHOD

INCORPORATION BY REFERENCE

This application is based upon and claims the benefit of priority from Japanese patent application No. 2021-175484, filed on Oct. 27, 2021, the disclosure of which is incorporated herein in its entirety by reference.

TECHNICAL FIELD

The present invention relates to a timestamp issuing method, a local timestamp issuing apparatus, and a program.

BACKGROUND ART

A timestamp is issued for electronic data such as a document, an image, a video and a sound in order to certify that the electronic data existed at specific time and that the electronic data has not been tampered with since specific time (see Patent Document 1). A timestamp is issued by an official time stamping authority designated by a country and the like by associating time information with a hash value of electronic data and digitally signing.

Patent Document 1: Japanese Patent Publication No. 6886350

A timestamp issuing server of the abovementioned official time stamping authority is usually installed on the Internet. Therefore, a user who requests a timestamp needs to be in an Internet-connected environment. However, in a case where a user who requests a timestamp is an organization such as a public institution and a company that has implemented information leakage countermeasures, an information processing apparatus of the organization is basically in an offline environment. Then, a problem arises that such an organization cannot request a timestamp from the official time stamping authority on the Internet.

On the other hand, in the organization in the offline environment as mentioned above, it is also conceivable to install a local time stamping authority in a local environment within the organization and have the local time stamping authority issue a timestamp. In this case, however, since the local time stamping authority is not an official time stamping authority, there arises a problem that the timestamp is unreliable.

SUMMARY OF THE INVENTION

Accordingly, an object of the present invention is to provide a timestamp issuing method capable of solving the abovementioned problem that a highly reliable timestamp cannot be issued in the offline environment.

A timestamp issuing method as an aspect of the present invention is a timestamp issuing method by a local timestamp issuing apparatus installed in an offline environment. The timestamp issuing method includes: in response to a request for a timestamp for electronic data by a predetermined information processing apparatus installed in a local environment same as the local timestamp issuing apparatus, issuing a timestamp token for the electronic data; at a preset timing, connecting to a specific timestamp issuing apparatus installed on Internet, and requesting a timestamp for ledger data including the timestamp token issued for the electronic data from the specific timestamp issuing apparatus; and acquiring the timestamp token issued for the ledger data from the specific timestamp issuing apparatus.

Further, a local timestamp issuing apparatus as an aspect of the present invention is a local timestamp issuing apparatus installed in an offline environment. The timestamp issuing apparatus includes: a timestamp issuing unit configured to, in response to a request for a timestamp for electronic data by a predetermined information processing apparatus installed in a local environment same as the local timestamp issuing apparatus, issue a timestamp token for the electronic data; a ledger timestamp requesting unit configured to, at a preset timing, connect to a specific timestamp issuing apparatus installed on Internet, and request a timestamp for ledger data including the timestamp token issued for the electronic data from the specific timestamp issuing apparatus; and a ledger timestamp acquiring unit configured to acquire the timestamp token issued for the ledger data from the specific timestamp issuing apparatus.

Further, a computer program as an aspect of the present invention includes instructions for causing a local timestamp issuing apparatus installed in an offline environment to execute processes to: in response to a request for a timestamp for electronic data by a predetermined information processing apparatus installed in a local environment same as the local timestamp issuing apparatus, issue a timestamp token for the electronic data; at a preset timing, connect to a specific timestamp issuing apparatus installed on Internet, and request a timestamp for ledger data including the timestamp token issued for the electronic data from the specific timestamp issuing apparatus; and acquire the timestamp token issued for the ledger data from the specific timestamp issuing apparatus.

With the configurations as described above, the present invention makes it possible to issue a highly reliable timestamp even in the offline environment.

BRIEF DESCRIPTION OF DRAWINGS

FIG. 3 is a figure showing an example of a data structure of a timestamp ledger stored in the local time stamping authority server disclosed in FIG. 1;

FIG. 6 is a figure showing a modified example of the data structure of the timestamp ledger stored in the local time stamping authority server disclosed in FIG. 1;

EXAMPLE EMBODIMENT

First Example Embodiment

Figure 1:
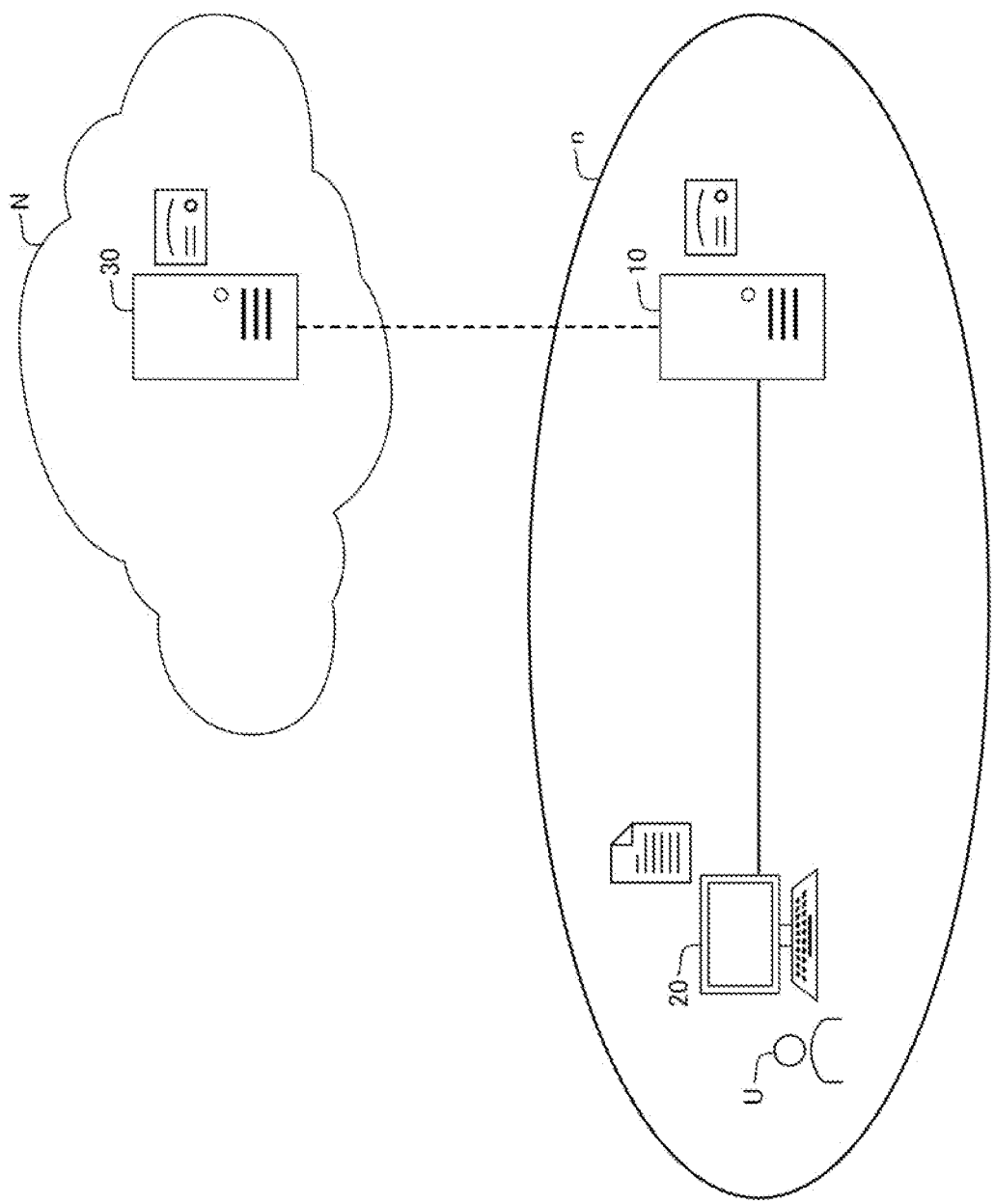
FIG. 1 is a figure showing an overall configuration of a timestamp issuing system according to a first example embodiment of the present invention.
Figure 2:
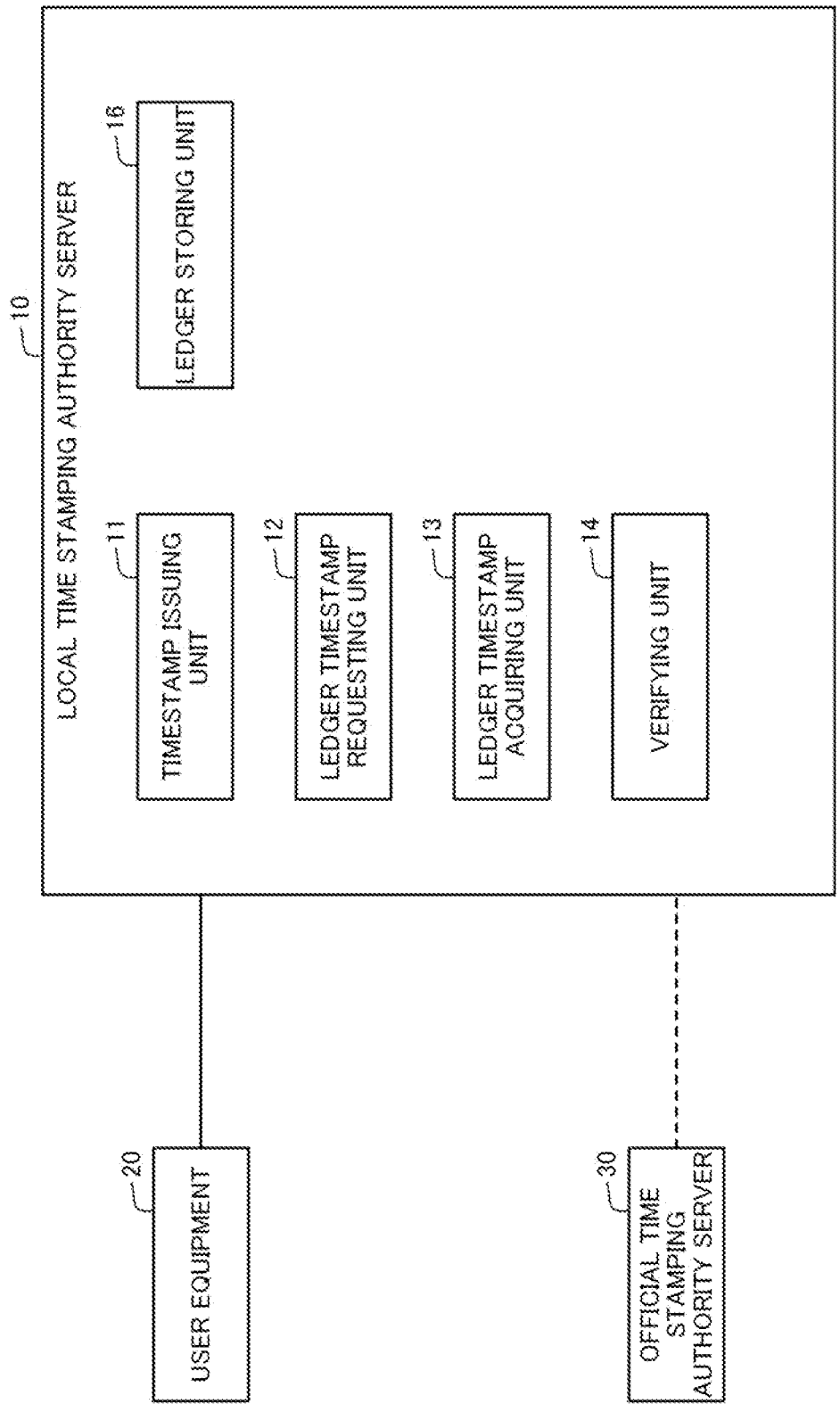
FIG. 2 is a block diagram showing a structure of a local time stamping authority server disclosed in FIG. 1.
Figure 3:
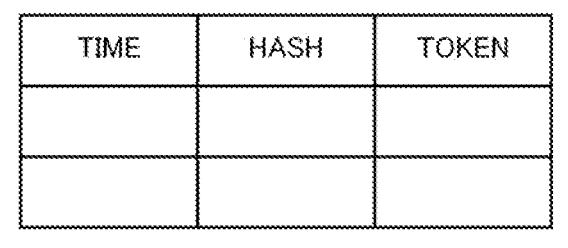
Figure 4:
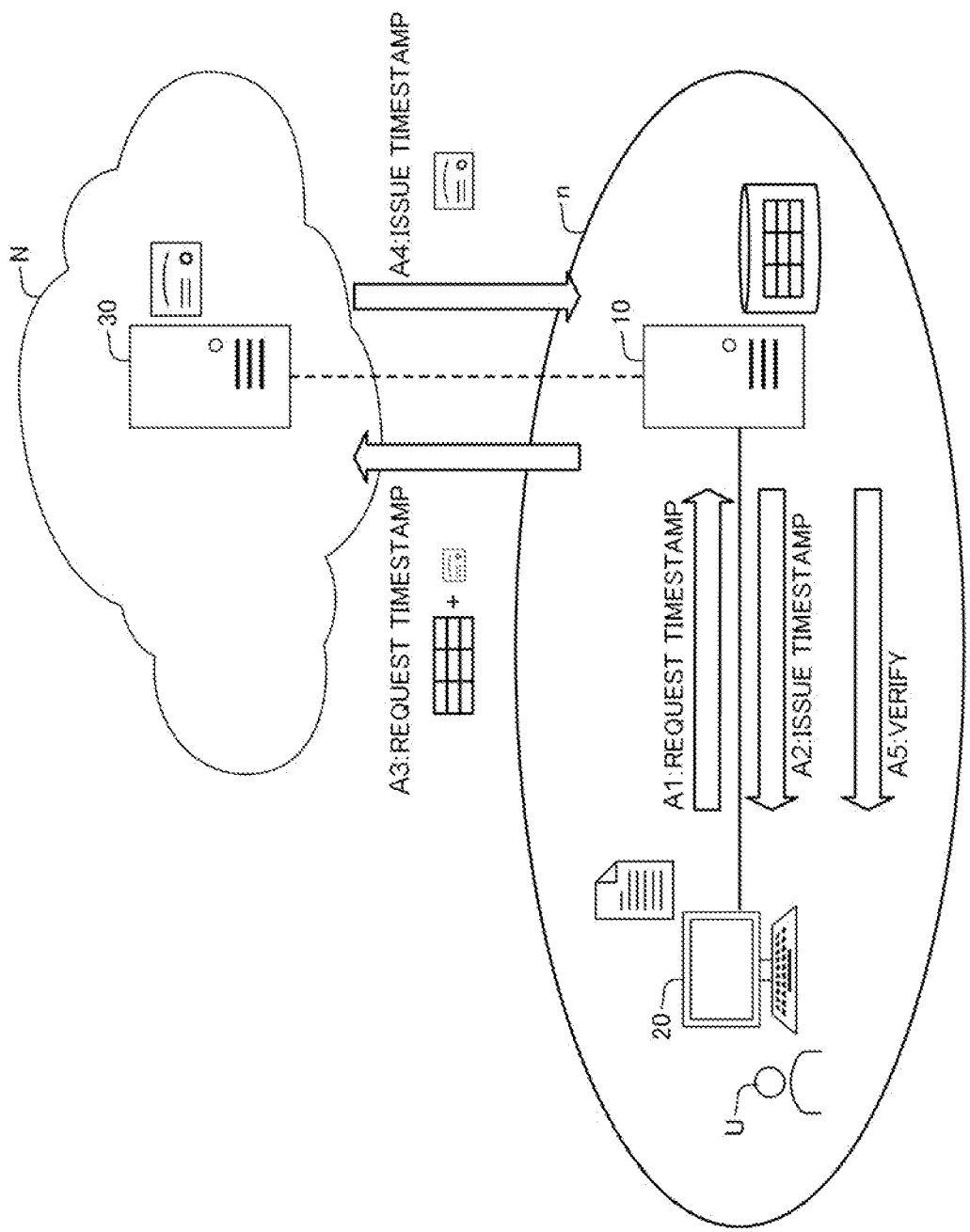
FIG. 4 is a figure showing an operation in a timestamp issuing process by the timestamp issuing system disclosed in FIG. 1.
Figure 5:
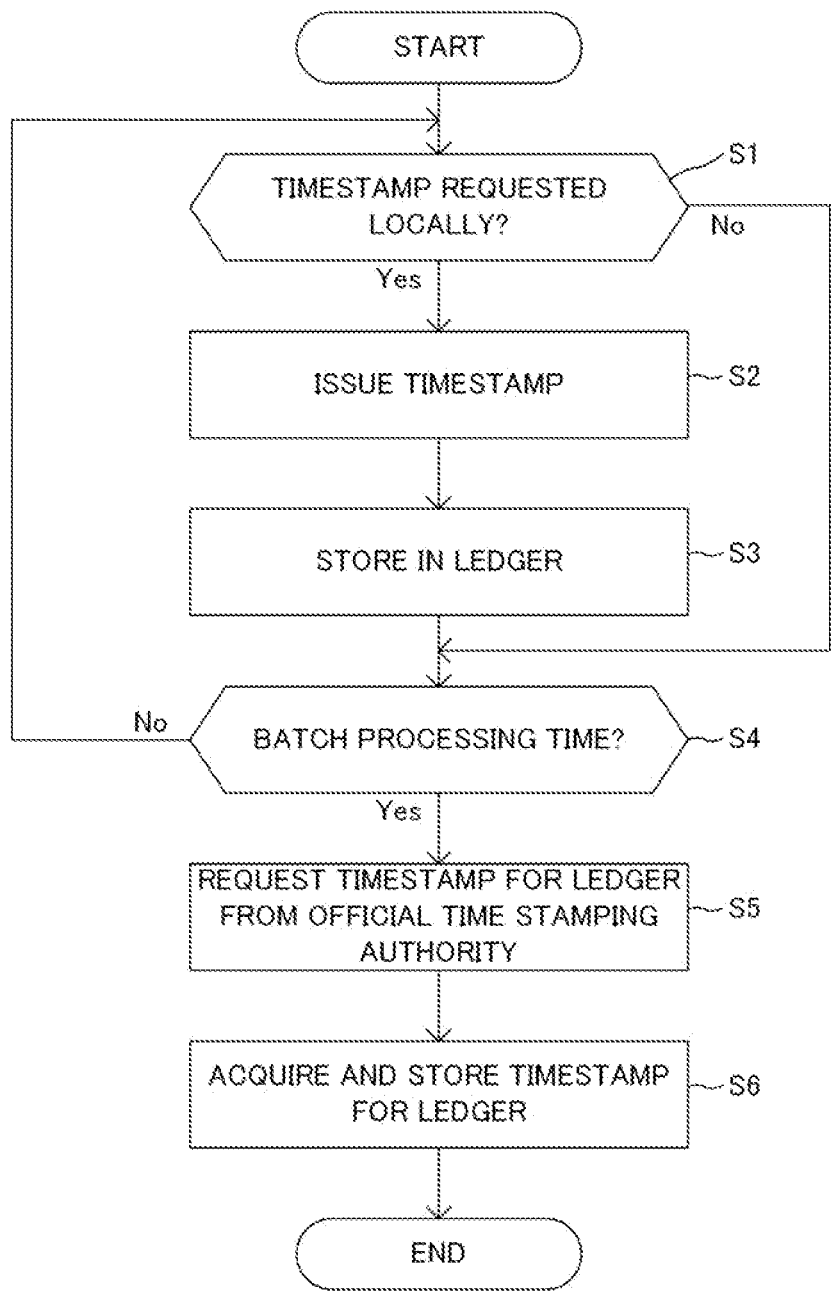
FIG. 5 is a flowchart showing an operation of the local time stamping authority server disclosed in FIG. 1.
Figure 6:
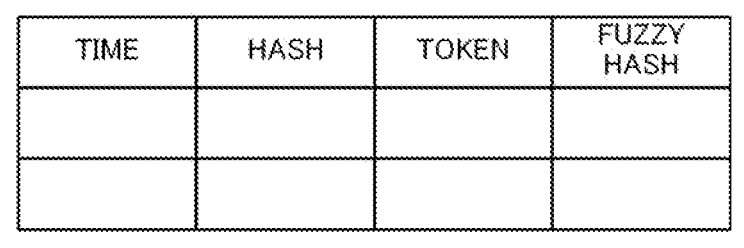

A first example embodiment of the present invention will be described with reference to FIGS. 1 to 6. FIGS. 1 to 3 are figures for describing a configuration of a timestamp issuing system, and FIGS. 4 to 5 are figures for describing a processing operation of the timestamp issuing system. FIG. 6 is a figure for describing a modified example of the timestamp issuing system.

[Configuration]

A timestamp issuing system according to the present invention is a system for issuing a timestamp for electronic data such as a document, an image, a video and a sound in order to certify that the electronic data existed at specific time and that the electronic data has not been tampered with since specific time. In particular, according to the present invention, the timestamp issuing system is configured to be able to issue a highly reliable timestamp in an offline environment in which there is no connection to the external Internet.

As shown in FIG. 1, the timestamp issuing system in this example embodiment includes a local time stamping authority server 10 and user equipment 20 that are installed within a local network n. For example, the local network n is an intranet of a specific organization such as a public institution and a company where information leakage countermeasures are implemented, and is basically in an offline environment in which there is no connection to an external Internet N.

The user equipment 20 is a predetermined information processing apparatus operated by a user U such as an employee of the specific organization. The local time stamping authority server 10 is a server apparatus operated by the specific organization. As will be described later, the local time stamping authority server 10 is configured to accept a request for a timestamp for electronic data such as a document created by the user U from the user equipment 20 and issue the timestamp, and functions as a local timestamp issuing apparatus that issues a timestamp in a local environment.

Further, the local time stamping authority server 10 can be connected to the external Internet N only at a preset timing, for example, at determined time on each day. An official time stamping authority server 30 operated by an official time stamping authority designated by a country and the like is installed on the external Internet N. The official time stamping authority server 30 functions as a timestamp issuing apparatus configured to, in response to a request for a timestamp for electronic data from an organization and a user registered in advance, issue the timestamp. The local time stamping authority server 10 can access the official time stamping authority server 30 only when connection to the external Internet N is available. Below, the configuration of the local time stamping authority server 10 will be mainly described in detail.

The local time stamping authority server 10 is configured by one or a plurality of information processing apparatuses including an operation device and a storage device. As shown in FIG. 2, the local time stamping authority server 10 includes a timestamp issuing unit 11, a ledger timestamp requesting unit 12, a ledger timestamp acquiring unit 13, and a verifying unit 14. The respective functions of the timestamp issuing unit 11, the ledger timestamp requesting unit 12, the ledger timestamp acquiring unit 13 and the verifying unit 14 are implemented by execution of a program for implementing the respective functions stored in the storage device by the operation device. Moreover, the local time stamping authority server 10 includes a ledger storing unit 16. The ledger storing unit 16 is configured by the storage device. Below, the respective components will be described in detail.

Upon accepting a request for a timestamp for electronic data from the user equipment 20, the timestamp issuing unit 11 issues a timestamp token for the electronic data. Specifically, the timestamp issuing unit 11 issues a timestamp token by adding time information to a hash value of electronic data for which a timestamp is requested and digitally signing. At this time, the timestamp issuing unit 11 may transmit the issued timestamp token to the user equipment 20 or may transmit the timestamp token to the user equipment 20 after verification of a timestamp ledger including the timestamp token as will be described later.

Then, with the issue of the timestamp token, the timestamp issuing unit 11 stores a record formed by a combination of the hash value of the electronic data, the time information and the timestamp token as information about the timestamp token into a timestamp ledger as shown in FIG. 3, and stores into the ledger storing unit 16. At this time, the timestamp issuing unit 11 stores information about one time stamp for each record in the timestamp ledger, but may store a plurality of records, that is, records formed by combinations of hash values, time information and timestamp tokens corresponding to a plurality of electronic data, respectively, in the timestamp ledger.

The ledger timestamp requesting unit 12 connects to the official time stamping authority server 30 (specific timestamp issuing apparatus) installed on the external Internet N via the external network N at a preset timing. Then, the ledger timestamp requesting unit 12 requests a timestamp for the timestamp ledger (ledger data) stored in the ledger storing unit 16 from the official time stamping authority server 30. In other words, the local time stamping authority server 10, which is normally in the offline state, connects to the external Internet N only at a preset timing, and requests a timestamp for the timestamp ledger from the official time stamping authority server 30. The timing at which the local time stamping authority server 10 connects to the external Internet N is set to specific time of the night as an example, and batch processing starts at the specific time every day to request a timestamp for the timestamp ledger. The preset timing described above may be any timing. For example, the preset timing may be a periodic timing such as specific time every day or every time a certain period of time elapses, or may be a timing when a preset event occurs.

In a case where the timestamp ledger contains a plurality of records, the ledger timestamp requesting unit 12 requests a timestamp in a state in which the contained records are put together. That is to say, the ledger timestamp requesting unit 12 requests a timestamp for the timestamp ledger containing all the records stored after the previous timestamp request. For this, the ledger timestamp requesting unit 12 is configured to, in the case of being set to connect to the official time stamping authority server 30 installed on the external Internet N at the preset timing as described above, request a timestamp for the timestamp ledger containing all the records issued and stored during the connecting timings from the official time stamping authority server 30. For example, in the case of being configured to start batch processing on each day, the ledger timestamp requesting unit 12 requests a timestamp for the timestamp ledger containing all the records stored before the start of the batch processing of the day.

When the local time stamping authority server 10 requests a timestamp for the timestamp ledger from the official time stamping authority server 30, the ledger timestamp acquiring unit 13 acquires a timestamp token for the timestamp ledger (ledger timestamp token) issued by the official time stamping authority server 30 as will be described later. In accordance with this, when newly requesting a timestamp from the official time stamping authority server 30 in the abovementioned manner, the ledger timestamp requesting unit 12 includes a ledger timestamp token acquired from the official time stamping authority server 30 in the past into a new timestamp ledger for which a timestamp is to be requested, and requests the timestamp for the new timestamp ledger. In particular, the ledger timestamp requesting unit 12 includes a ledger timestamp token acquired from the official time stamping authority server 30 at the time of the most recent, that is, the previous timestamp request into the new timestamp ledger, and requests the timestamp. However, the ledger timestamp requesting unit 12 may include a plurality of past ledger timestamp tokens into the new timestamp ledger and request the timestamp, or may request the timestamp without including the past ledger timestamp token. At the time of requesting the timestamp for the timestamp ledger, the ledger timestamp requesting unit 12 may transmit the timestamp ledger and the ledger timestamp token to the official time stamping authority server 30, or may transmit the timestamp ledger and only the hash value of the ledger timestamp token to the official time stamping authority server 30.

The ledger timestamp acquiring unit 13 acquires a ledger timestamp token, which is a timestamp token for a timestamp ledger issued by the official time stamping authority server 30 in response to a timestamp request by the ledger timestamp requesting unit 12, and stores into the ledger storing unit 16. The official time stamping authority server 30 issues a ledger timestamp token by adding time information to a hash value of a timestamp ledger (including a past ledger timestamp token in some cases) for which a timestamp is requested and digitally signing. The ledger timestamp token stored in the ledger storing unit 16 of the local time stamping authority server 10 is retrieved by the ledger timestamp requesting unit 12 as described above and included into a new timestamp ledger, and a timestamp is requested from the official time stamping authority server 30.

The verifying unit 14 cooperates with the user equipment 20 to verify electronic data for which a timestamp is requested by the user equipment 20. Specifically, the verifying unit 14 verifies a timestamp ledger by using a ledger timestamp token issued by the official time stamping authority server 30. For example, the verifying unit 14 decrypts a ledger timestamp token acquired from the official time stamping authority server 30 by using a public key of the official time stamping authority server 30, and performs verification in accordance with whether or not the hash value of the timestamp ledger stored in the ledger storing unit 16 and the hash value contained in the ledger timestamp token match. In a case where the hash values match, it is certified that the time stamp ledger stored in the ledger storing unit 16 existed at time of the time information contained in the ledger time stamp token and has not been tampered with since the time. Therefore, it is also certified that the timestamp token for the electronic data contained by the timestamp ledger existed at time of the time information contained by the ledger time stamp token and has not been tampered with since the time. In a case where the ledger timestamp includes a past ledger timestamp token, it is certified that the past ledger timestamp token existed at time of the time information and has not been tampered with since the time.

The verifying unit 14 then transmits the timestamp token included by the timestamp ledger as a verified one to the user equipment 20. Consequently, the user equipment 20 can verify the electronic data by using the timestamp token issued by the local time stamping authority server 10 and verified with the timestamp of the official time stamping authority server 30. Specifically, the user equipment 20 decrypts the timestamp token by using the public key of the local time stamping authority server 10, and performs verification in accordance with whether or not the hash value of the target electronic data and the hash value contained by the timestamp token match. In a case where the hash values match, it is certified by the local time stamping authority server 10 that the electronic data stored in the user equipment 20 existed at time of the time information included in the timestamp token and has not been tampered with since the time. Then, since it is certified as described above that this timestamp token existed at time when the timestamp was issued by the official time stamping authority server 30 and has not been tampered with since the time, it is also certified about the electronic data.

The verifying unit 14 may certify a timestamp token of electronic data when receiving a request for verification of the electronic data from the user equipment 20. That is to say, the verifying unit 14 may verify a timestamp ledger including a timestamp token of electronic data for which the user equipment 20 requests verification, by using a ledger timestamp token, and transmit the result to the user equipment 20.

[Operation]

Next, an operation of the timestamp issuing system described above, particularly, an operation of the local time stamping authority server 10, that is, an operation in a local timestamp issuing method will be described mainly with reference to FIGS. 4 and 5. The local time stamping authority server 10 is basically in an offline environment in which there is no connection to the external Internet, and is connected to the user equipment 20 within the local network n.

Upon receiving a request for a timestamp for electronic data from the user equipment 20 in the offline environment (reference symbol A1 in FIG. 4, Yes at step S1 in FIG. 5), the local time stamping authority server 10 issues a timestamp token for the electronic data (reference symbol A2 in FIG. 4, step S2 in FIG. 5). Meanwhile, the local time stamping authority server 10 may transmit the timestamp token to the user equipment 20 at this point of time, or may transmit the timestamp token to the user equipment 20 after acquiring a ledger timestamp token for a timestamp ledger including the timestamp token from the official time stamping authority server 30 later.

With the issue of the timestamp token, as shown in FIG. 3, the local time stamping authority server 10 stores a record as information about the timestamp token including a combination of a hash value of the electronic data, time information and the timestamp token into a timestamp ledger, and stores into the ledger storing unit 16. Then, until a preset timing, for example, a timing of batch processing once a day (No at step S4 in FIG. 5), the local time stamping authority server 10 issues a timestamp for electronic data in response to a request from the user equipment 20 (steps S1 and S2 in FIG. 5), and stores a record as information about the timestamp into the timestamp ledger (step S3 in FIG. 5).

At the preset timing, for example, the timing of batch processing once a day (Yes at step S4 in FIG. 5), the local time stamping authority server 10 is brought to a state in which it can connect to the official time stamping authority server 30 installed on the external Internet via the external Internet N from the offline environment only at this time. Then, the local time stamping authority server 10 requests a timestamp for the timestamp ledger stored in the ledger storing unit 16 from the official time stamping authority server 30 (reference symbol A3 in FIG. 4, step S5 in FIG. 5). At this time, the local time stamping authority server 10 includes a ledger timestamp token acquired from the official time stamping authority server 30 in the past into a new timestamp ledger for which a timestamp is to be requested, and requests a timestamp for the new timestamp ledger. In particular, the local time stamping authority server 10 includes a ledger timestamp token acquired from the official time stamping authority server 30 at the time of the most recent timestamp request, that is, the previous timestamp request into the new timestamp ledger, and requests a timestamp.

After that, the local time stamping authority server 10 acquires a ledger timestamp token that is a timestamp token for the timestamp ledger issued by the official time stamping authority server 30 in response to the timestamp request, and stores into the ledger storing unit 16 (reference symbol A4 in FIG. 4, step S6 in FIG. 5). The local time stamping authority server 10 is brought to the offline environment again after acquiring the ledger timestamp token from the official time stamping authority server 30.

Then, the ledger timestamp token stored in the ledger storing unit 16 of the local time stamping authority server 10 is used for verification of the electronic data held by the user equipment 20 (reference symbol A5 in FIG. 4). For example, verification of the electronic data held by the user equipment 20 is performed in the following manner. First, the local time stamping authority server 10 decrypts the ledger timestamp token issued by the official time stamping authority server 30 by using the public key of the official time stamping authority server 30, and checks whether or not the hash value of the timestamp ledger stored in the ledger storing unit 16 and the hash value included in the ledger timestamp token match. In a case where the hash values match, it is certified that the timestamp ledger stored in the ledger storing unit 16 existed at time of the time information included in the ledger timestamp token and has not been tampered with since the time. Therefore, it is also certified that the timestamp token for the electronic data included in the time stamp ledger existed at time of timestamping by the official time stamping authority server 30 and has not been tampered with after the time.

Then, verification of the electronic data using the verified timestamp token included in the timestamp ledger by the user equipment 20, it can be certified that the electronic data existed at time when the official time stamping authority server 30 issued the ledger timestamp token and has not been tampered with since the time. The verification of the electronic data by the user equipment 20 is performed by decrypting the timestamp token by using the public key of the local time stamping authority server 10 and checking whether the hash value of the target electronic data and the hash value included in the timestamp token match.

Thus, according to this example embodiment, even when the local time stamping authority server 10 in the offline environment is used, it is possible, by having the official time stamping server 30 issue a timestamp for a timestamp ledger including a timestamp token of electronic data to be verified, to certify that the electronic data existed at time of the timestamp and has not been tampered with since the time. As a result, it is possible to issue a highly reliable timestamp even in the offline environment.

Then, in a case where timestamping is performed including a ledger timestamp token of a past timestamp ledger in a timestamp ledger, it is possible to prevent the past timestamp ledger from being tampered with, and therefore, reliability is more increased.

[Modified Example]

Next, a modified example of the above timestamp issuing system will be described. The timestamp issuing unit 11 of the local time stamping authority server 10 may, with the issue of a timestamp token, generate a timestamp ledger as shown in FIG. 6 and store into the ledger storing unit 16. Specifically, a record of the issued timestamp token stored in the timestamp ledger in the modified example includes a combination of a hash value of electronic data, time information, the timestamp token, and a Fuzzy Hash value of the electronic data. A Fuzzy Hash value is one of the hash values of electronic data, and is calculated using a function such that close values are calculated between electronic data when the electronic data are similar to each other. Examples of Fuzzy Hash values are those calculated using hash functions such as imphash and ssdeep.

Then, the ledger timestamp requesting unit 12 of the local time stamping authority server 10 requests a timestamp for a timestamp ledger including a fuzzy hash value as shown in FIG. 6 stored in the ledger storing unit 16 from the official time stamping authority server 30 installed on the external Internet N at a preset timing in the same manner as described above. At this time, in the same manner as described above, the ledger timestamp requesting unit 12 may include the ledger timestamp token acquired from the official time stamping authority server 30 in the past into a new timestamp ledger for which a timestamp is to be requested, and request the timestamp for the new timestamp ledger.

As described above, by including a fuzzy hash value of electronic data into a timestamp ledger and acquiring a timestamp from the official time stamping authority server 30, it becomes possible, by using the fuzzy hash value, to facilitate search for electronic data similar to verified electronic data and also perform verification of the similar electronic data.

Second Example Embodiment

Figure 7:
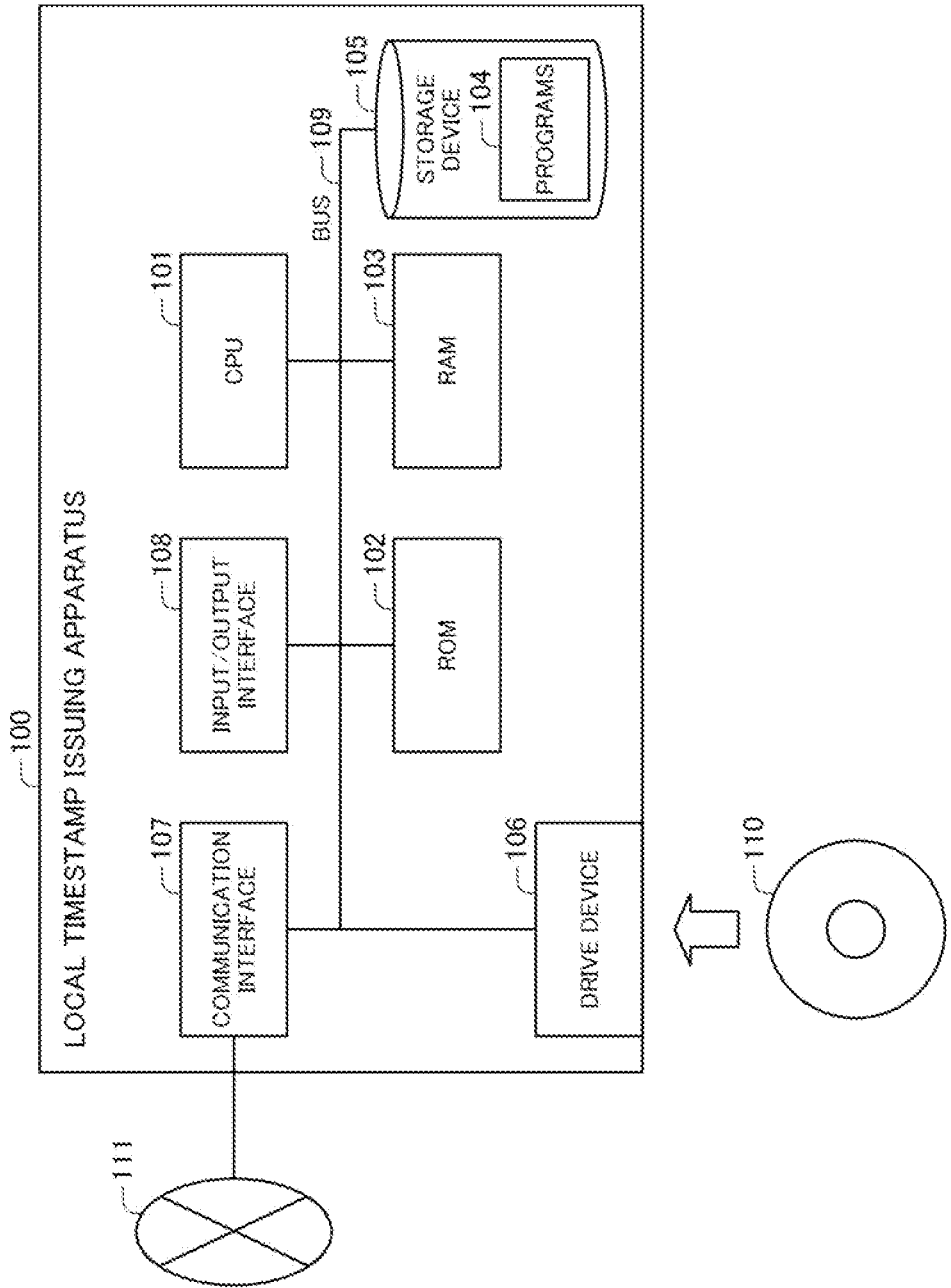
FIG. 7 is a block diagram showing a hardware configuration of a local timestamp issuing apparatus in a second example embodiment of the present invention.
Figure 8:
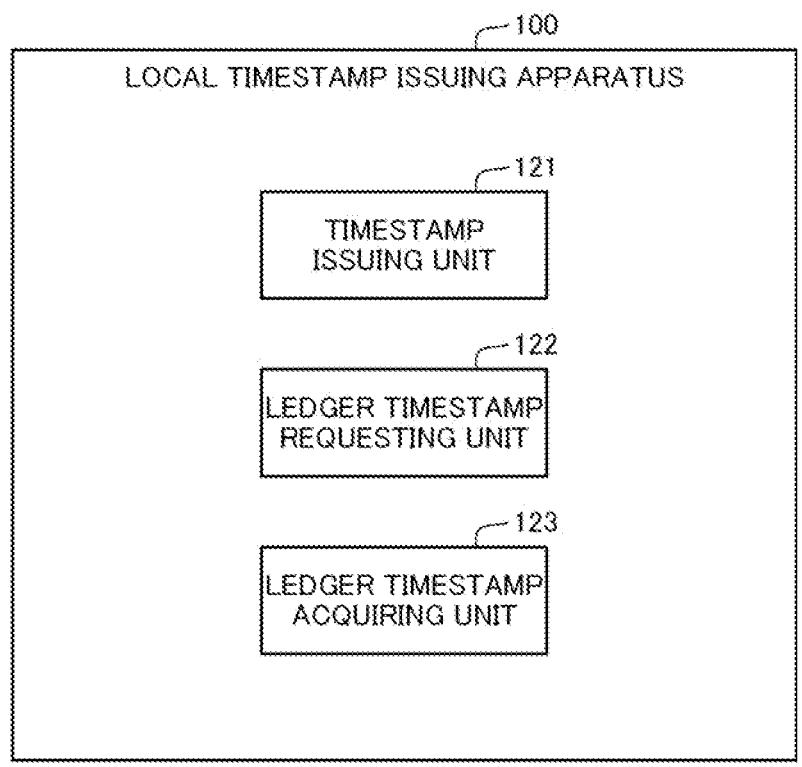
FIG. 8 is a block diagram showing a configuration of the local timestamp issuing apparatus in the second example embodiment of the present invention.
Figure 9:
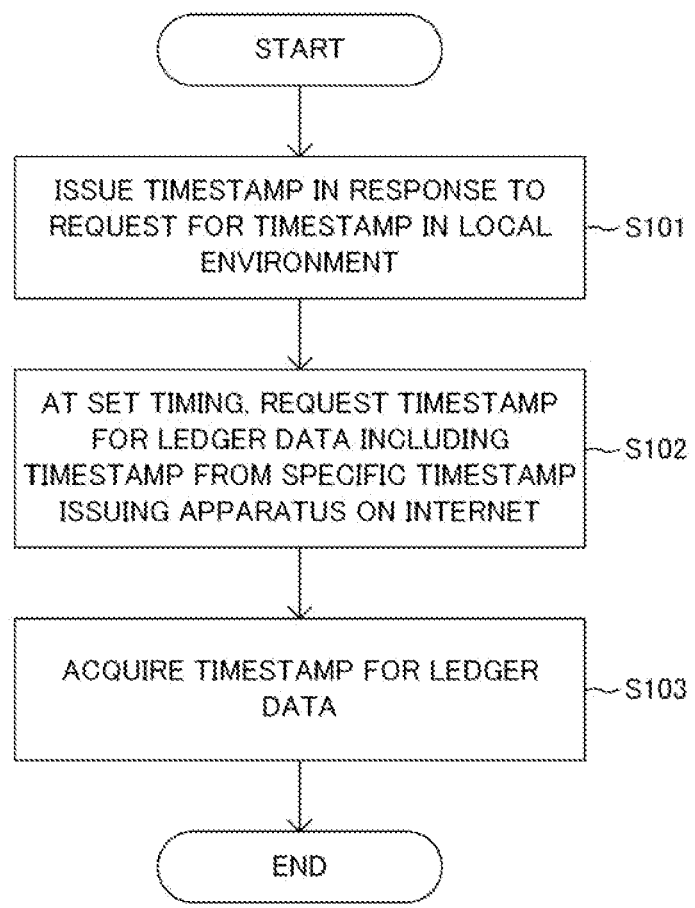
FIG. 9 is a flowchart showing an operation of the local timestamp issuing apparatus in the second example embodiment of the present invention.

Next, a second example embodiment of the present invention will be described with reference to FIGS. 7 to 9. FIGS. 7 to 8 are block diagrams showing a configuration of a local timestamp issuing apparatus in the second example embodiment, and FIG. 9 is a flowchart showing an operation of the local timestamp issuing apparatus. In this example embodiment, the outline of the configurations of the local time stamping authority server 10 and the local timestamp issuing method described in the above example embodiment are shown.

First, with reference to FIG. 7, a hardware configuration of a local timestamp issuing apparatus 100 in this example embodiment will be described. The local timestamp issuing apparatus 100 is configured by a general information processing apparatus and, as an example, has a hardware configuration as shown below including;

a CPU (Central Processing Unit) 101 (operation device),
a ROM (Read Only Memory) 102 (storage device),
a RAM (Random Access Memory) 103 (storage device),
programs 104 loaded to the RAM 103,
a storage device 105 for storing the programs 104,
a drive device 106 reading from and writing into a storage medium 110 outside the information processing apparatus,
a communication interface 107 connecting to a communication network 111 outside the information processing apparatus, an input/output interface 108 inputting and outputting data, and a bus 109 connecting the respective components.

Then, by acquisition and execution of the programs 104 by the CPU 101, the local timestamp issuing apparatus 100 can structure and have a timestamp issuing unit 121, a ledger timestamp requesting unit 122 and a ledger timestamp acquiring unit 123 shown in FIG. 8. The programs 104 are, for example, stored in the storage device 105 or the ROM 102 in advance, and loaded to the RAM 103 and executed by the CPU 101 as necessary. Alternatively, the programs 104 may be supplied to the CPU 101 via the communication network 111, or may be stored in the storage medium 110 in advance and retrieved and supplied to the CPU 101 by the drive device 106. However, the timestamp issuing unit 121, the ledger timestamp requesting unit 122 and the ledger timestamp acquiring unit 123 described above may be structured with dedicated electronic circuits for implementing those units.

FIG. 7 shows an example of the hardware configuration of the information processing apparatus that is the local timestamp issuing apparatus 100, and the hardware configuration of the information processing apparatus is not limited to the above case. For example, the information processing apparatus may be configured by part of the above configuration, for example, excluding the drive device 106.

Then, the local timestamp issuing apparatus 100 executes the local timestamp issuing method as shown by the flowchart of FIG. 9 with the functions of the timestamp issuing unit 121, the ledger timestamp requesting unit 122 and the ledger timestamp acquiring unit 123 structured by the program as described above.

As shown in FIG. 9, the local timestamp issuing apparatus 100 installed in an offline environment executes processes to:

in response to a request for a timestamp for electronic data by a predetermined information processing apparatus installed in the same local environment as the local timestamp issuing apparatus, issue the timestamp token for the electronic data (step S101);

connect to a specific timestamp issuing apparatus installed on the Internet at a preset timing, and request a timestamp for ledger data including the timestamp token issued for the electronic data from the specific timestamp issuing apparatus (step S102); and acquire the timestamp token issued for the ledger data from the specific timestamp issuing apparatus (step S103).

With the configuration as described above, the present invention makes it possible to certify with a timestamp issued by a specific timestamp issuing apparatus that a timestamp token included by ledger data existed at predetermined time and has not been tampered with since the predetermined time. Therefore, the reliability of verification of electronic data using a timestamp token issued by the local timestamp issuing apparatus is enhanced. As a result, even when a timestamp issuing apparatus in the offline environment is used, a highly reliable timestamp can be issued.

The abovementioned program can be stored by using various types of non-transitory computer-readable mediums and supplied to a computer. The non-transitory computer-readable mediums include various types of tangible storage mediums. Examples of the non-transitory computer-readable mediums include a magnetic recording medium (for example, flexible disk, magnetic tape, hard disk drive), a magnetooptical recording medium (for example, magnetooptical disk), a CD-ROM (Read Only Memory), a CD-R, a CD-R/W, and a semiconductor memory (for example, mask ROM, PROM (Programmable ROM), EPROM (Erasable PROM), flash ROM, RAM (Random Access Memory)). Moreover, the program may be supplied to a computer by various types of transitory computer-readable mediums. Examples of the transitory computer-readable mediums include electric signals, optical signals, and electromagnetic waves. The transitory computer-readable mediums can supply the program to a computer via a wired communication path such as electric lines and optical fibers or via a wireless communication path.

Although the present invention has been described above with reference to the example embodiments, the present invention is not limited to the above example embodiments. The configurations and details of the present invention can be changed in various manners that can be understood by one skilled in the art within the scope of the present invention. Moreover, at least one or more of the functions of the timestamp issuing unit 121, the ledger timestamp requesting unit 122 and the ledger timestamp acquiring unit 123 may be executed by an information processing apparatus installed at any place on the network and connected, that is, may be executed by so-called cloud computing.

Supplementary Notes

The whole or part of the example embodiments disclosed above can also be described as the following supplementary notes. Below, the outline of the configurations of a local timestamp issuing method, a local timestamp issuing apparatus and a program according to the present invention will be described. However, the present invention is not limited to the following configurations.

(Supplementary Note 1)

A timestamp issuing method by a local timestamp issuing apparatus installed in an offline environment, the timestamp issuing method comprising:

in response to a request for a timestamp for electronic data by a predetermined information processing apparatus installed in a local environment same as the local timestamp issuing apparatus, issuing a timestamp token for the electronic data;

at a preset timing, connecting to a specific timestamp issuing apparatus installed on Internet, and requesting a timestamp for ledger data including the timestamp token issued for the electronic data from the specific timestamp issuing apparatus; and acquiring the timestamp token issued for the ledger data from the specific timestamp issuing apparatus.

(Supplementary Note 2)

The timestamp issuing method according to Supplementary Note 1, comprising requesting, from the specific timestamp issuing apparatus, the timestamp for the ledger data including the timestamp token issued by the local timestamp issuing apparatus after requesting a timestamp from the specific timestamp issuing apparatus previous time.

(Supplementary Note 3)

The timestamp issuing method according to Supplementary Note 1 or 2, comprising requesting the timestamp for the ledger data including a plurality of timestamp tokens issued by the local timestamp issuing apparatus from the specific timestamp issuing apparatus.

(Supplementary Note 4)

The timestamp issuing method according to any of Supplementary Notes 1 to 3, comprising periodically at preset timings, connecting to the specific timestamp issuing apparatus and requesting the timestamp from the specific timestamp issuing apparatus.

(Supplementary Note 5)

The timestamp issuing method according to any of Supplementary Notes 1 to 4, comprising:

in response to the request for the timestamp for the electronic data by the predetermined information processing apparatus, issuing the timestamp token by adding time information to a hash value of the electronic data and digitally singing; and requesting the timestamp for the ledger data including the hash value, the time information and the timestamp token issued for the electronic data from the specific timestamp issuing apparatus.

(Supplementary Note 6)

The timestamp issuing method according to Supplementary Note 5, comprising requesting, from the specific timestamp issuing apparatus, the timestamp for the ledger data including the hash value, the time information, the timestamp token issued for the electronic data and a fuzzy hash value of the electronic data.

(Supplementary Note 7)

The timestamp issuing method according to any of Supplementary Notes 1 to 6, at a preset timing, requesting, from the specific timestamp issuing apparatus, the timestamp for the ledger data by including a timestamp token acquired from the specific timestamp issuing apparatus in past into the ledger data.

(Supplementary Note 8)

The timestamp issuing method according to Supplementary Note 7, comprising at a preset timing, requesting, from the specific timestamp issuing apparatus, the timestamp for the ledger data by including one timestamp token acquired from the specific timestamp issuing apparatus most recently into the ledger data.

(Supplementary Note 9)

A local timestamp issuing apparatus installed in an offline environment, the timestamp issuing apparatus comprising:

a timestamp issuing unit configured to, in response to a request for a timestamp for electronic data by a predetermined information processing apparatus installed in a local environment same as the local timestamp issuing apparatus, issue a timestamp token for the electronic data;

a ledger timestamp requesting unit configured to, at a preset timing, connect to a specific timestamp issuing apparatus installed on Internet, and request a timestamp for ledger data including the timestamp token issued for the electronic data from the specific timestamp issuing apparatus; and a ledger timestamp acquiring unit configured to acquire the timestamp token issued for the ledger data from the specific timestamp issuing apparatus.

(Supplementary Note 9.1)

The timestamp issuing apparatus according to Supplementary Note 9, wherein the ledger timestamp requesting unit is configured to request, from the specific timestamp issuing apparatus, the timestamp for the ledger data including the timestamp token issued by the local timestamp issuing apparatus after requesting a timestamp from the specific timestamp issuing apparatus previous time.

(Supplementary Note 9.2)

The timestamp issuing apparatus according to Supplementary Note 9 or 9.1, wherein the ledger timestamp requesting unit is configured to request the timestamp for the ledger data including a plurality of timestamp tokens issued by the local timestamp issuing apparatus from the specific timestamp issuing apparatus.

(Supplementary Note 9.3)

The timestamp issuing apparatus according to any of Supplementary Notes 9 to 9.2, wherein the ledger timestamp requesting unit is configured to, periodically at preset timings, connect to the specific timestamp issuing apparatus and request the timestamp from the specific timestamp issuing apparatus.

(Supplementary Note 9.4)

The timestamp issuing apparatus according to any of Supplementary Notes 9 to 9.3, wherein:

the timestamp issuing unit is configured to, in response to the request for the timestamp for the electronic data by the predetermined information processing apparatus, issue the timestamp token by adding time information to a hash value of the electronic data and digitally singing; and the ledger timestamp requesting unit is configured to request the timestamp for the ledger data including the hash value, the time information and the timestamp token issued for the electronic data from the specific timestamp issuing apparatus.

(Supplementary Note 9.5)

The timestamp issuing apparatus according to Supplementary Note 9.4, wherein the ledger timestamp requesting unit is configured to request, from the specific timestamp issuing apparatus, the timestamp for the ledger data including the hash value, the time information, the timestamp token issued for the electronic data and a fuzzy hash value of the electronic data.

(Supplementary Note 9.6)

The timestamp issuing apparatus according to any of Supplementary Notes 9 to 9.5, wherein the ledger timestamp requesting unit is configured to, at a preset timing, request, from the specific timestamp issuing apparatus, the timestamp for the ledger data by including a timestamp token acquired from the specific timestamp issuing apparatus in past into the ledger data.

(Supplementary Note 9.7)

The timestamp issuing apparatus according to Supplementary Note 9.6, wherein the ledger timestamp requesting unit is configured to, at a preset timing, request, from the specific timestamp issuing apparatus, the timestamp for the ledger data by including one timestamp token acquired from the specific timestamp issuing apparatus most recently into the ledger data.

(Supplementary Note 10)

A computer program comprising instructions for causing a local time stamp issuing apparatus installed in an offline environment to execute processes to:

in response to a request for a timestamp for electronic data by a predetermined information processing apparatus installed in a local environment same as the local timestamp issuing apparatus, issue a timestamp token for the electronic data;

at a preset timing, connect to a specific timestamp issuing apparatus installed on Internet, and request a timestamp for ledger data including the timestamp token issued for the electronic data from the specific timestamp issuing apparatus; and acquire the timestamp token issued for the ledger data from the specific timestamp issuing apparatus.

DESCRIPTION OF NUMERALS 10 local time stamping authority server
11 timestamp issuing unit 12 ledger timestamp requesting unit
13 ledger timestamp acquiring unit
14 verifying unit
16 ledger storing unit
20 user equipment
30 official time stamping authority server
N external network
n local network
U user
100 local timestamp issuing apparatus
101 CPU
102 ROM
103 RAM
104 programs
105 storage device
106 drive device
107 communication interface
108 input/output interface
109 bus
110 storage medium
111 communication network
121 timestamp issuing unit
122 ledger timestamp requesting unit
123 ledger timestamp acquiring unit

The invention claimed is:

1. A timestamp issuing method by a local timestamp issuing apparatus installed in an offline environment, the timestamp issuing method comprising:
   in response to a request for a timestamp for electronic data by a predetermined information processing apparatus installed in a local environment same as the local timestamp issuing apparatus, issuing a timestamp token for the electronic data by adding time information to a hash value of the electronic data and digitally signing;
   at a preset timing, connecting to a specific timestamp issuing apparatus installed on Internet, and requesting a timestamp for ledger data including the hash value, the time information, the timestamp token issued for the electronic data, and a fuzzy hash value of the electronic data from the specific timestamp issuing apparatus; and
   acquiring the timestamp token issued for the ledger data from the specific timestamp issuing apparatus.

2. The timestamp issuing method according to claim 1, comprising
   requesting, from the specific timestamp issuing apparatus, the timestamp for the ledger data including the timestamp token issued by the local timestamp issuing apparatus after requesting a timestamp from the specific timestamp issuing apparatus previous time.

3. The timestamp issuing method according to claim 1, comprising
   requesting the timestamp for the ledger data including a plurality of timestamp tokens issued by the local timestamp issuing apparatus from the specific timestamp issuing apparatus.

4. The timestamp issuing method according to claim 1, comprising
   periodically at preset timings, connecting to the specific timestamp issuing apparatus and requesting the timestamp from the specific timestamp issuing apparatus.

5. The timestamp issuing method according to claim 1, comprising
   at a preset timing, requesting, from the specific timestamp issuing apparatus, the timestamp for the ledger data by including a timestamp token acquired from the specific timestamp issuing apparatus in past into the ledger data.

6. The timestamp issuing method according to claim 5, comprising
   at a preset timing, requesting, from the specific timestamp issuing apparatus, the timestamp for the ledger data by including one timestamp token acquired from the specific timestamp issuing apparatus most recently into the ledger data.

7. A local timestamp issuing apparatus installed in an offline environment, the timestamp issuing apparatus comprising:
   at least one memory storing processing instructions; and
   at least one processor configured to execute the processing instructions to:
   in response to a request for a timestamp for electronic data by a predetermined information processing apparatus installed in a local environment same as the local timestamp issuing apparatus, issue a timestamp token for the electronic data by adding time information to a hash value of the electronic data and digitally signing;
   at a preset timing, connect to a specific timestamp issuing apparatus installed on Internet, and request a timestamp for ledger data including the hash value, the time information, the timestamp token issued for the electronic data, and a fuzzy hash value of the electronic data from the specific timestamp issuing apparatus; and
   acquire the timestamp token issued for the ledger data from the specific timestamp issuing apparatus.

8. A non-transitory computer-readable storage medium storing a program stored executable by a local time stamp issuing apparatus installed in an offline environment to:
   in response to a request for a timestamp for electronic data by a predetermined information processing apparatus installed in a local environment same as the local timestamp issuing apparatus, issue a timestamp token for the electronic data by adding time information to a hash value of the electronic data and digitally signing;
   at a preset timing, connect to a specific timestamp issuing apparatus installed on Internet, and request a timestamp for ledger data including the hash value, the time information, the timestamp token issued for the electronic data, and a fuzzy hash value of the electronic data from the specific timestamp issuing apparatus; and
   acquire the timestamp token issued for the ledger data from the specific timestamp issuing apparatus.

* * * * *